Nov. 13, 1934.  E. R. FISH  1,980,262
TRANSMISSION GEARING
Filed July 18, 1931  3 Sheets-Sheet 1
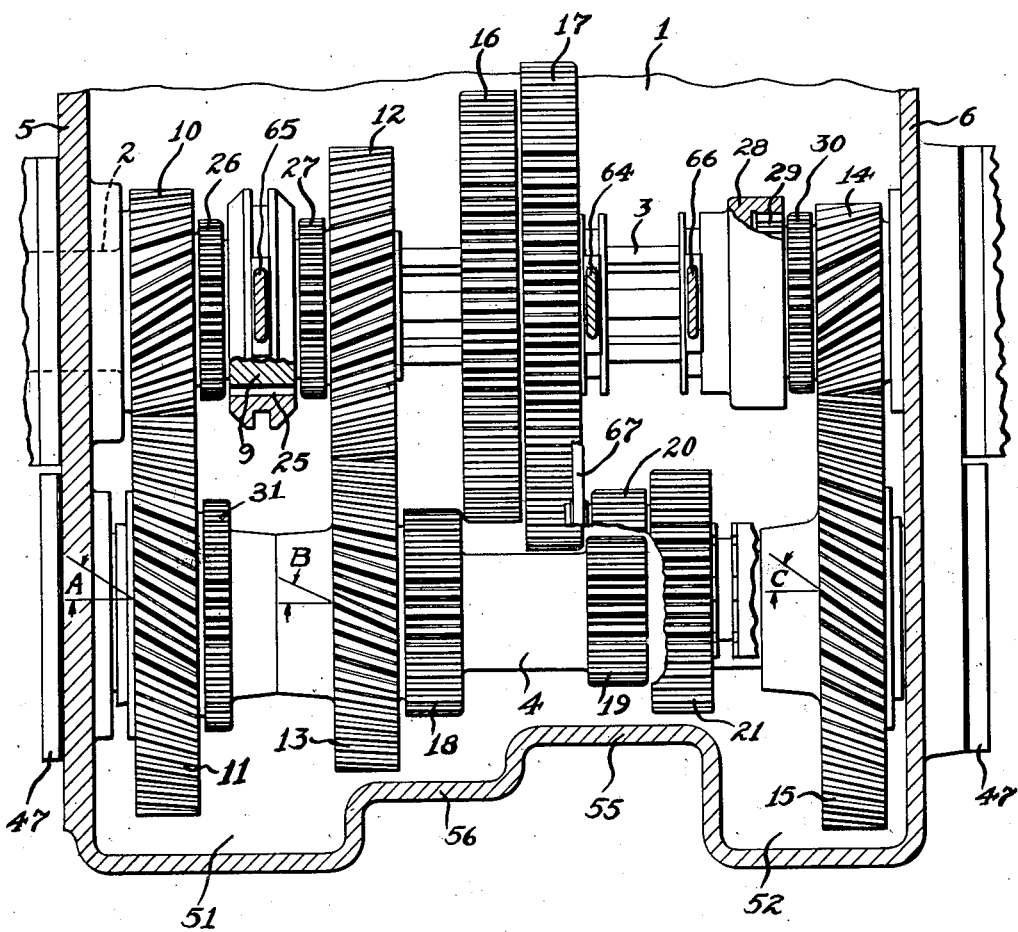
Fig-1-
INVENTOR
Earl R. Fish
BY
Bodell & Thompson
ATTORNEYS.

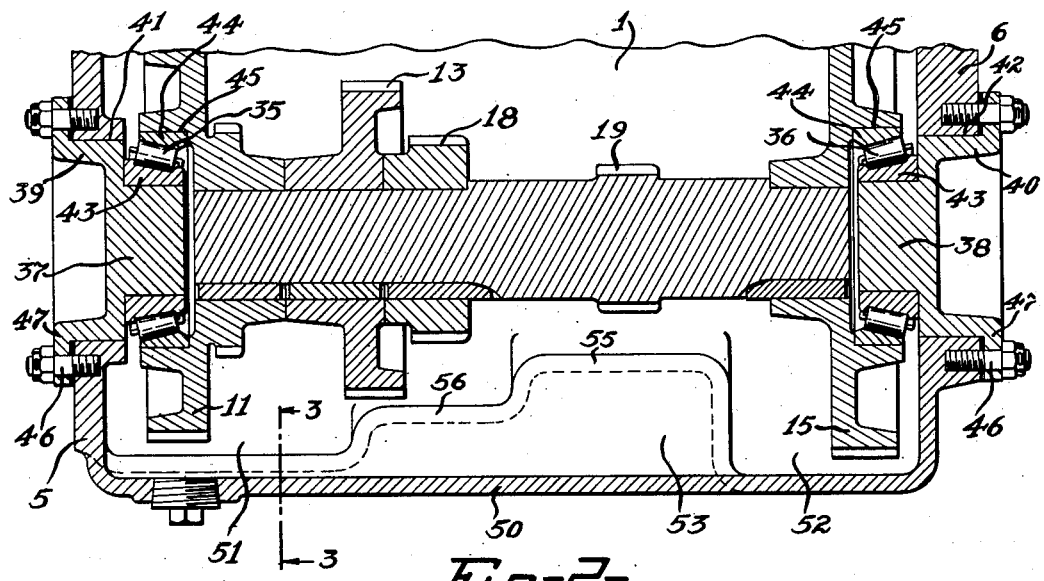
Fig-2-
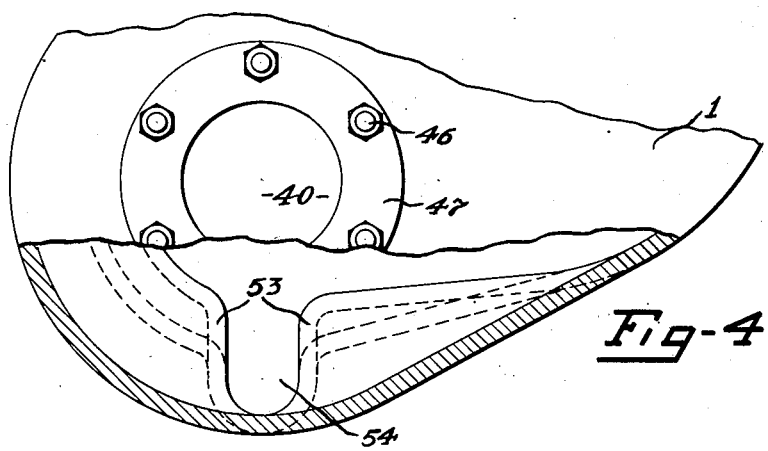
Fig-4-
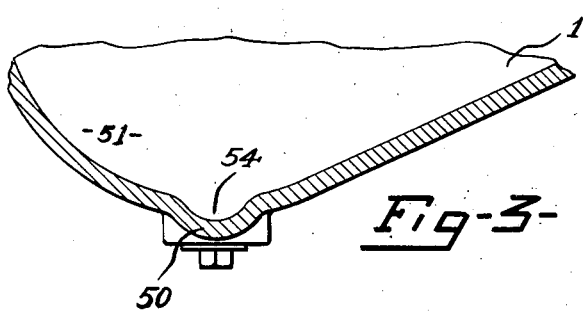
Fig-3-
INVENTOR
Earl R. Fish
BY
Rodell & Thompson
ATTORNEYS.

Nov. 13, 1934.  E. R. FISH  1,980,262
TRANSMISSION GEARING
Filed July 18, 1931  3 Sheets-Sheet 3
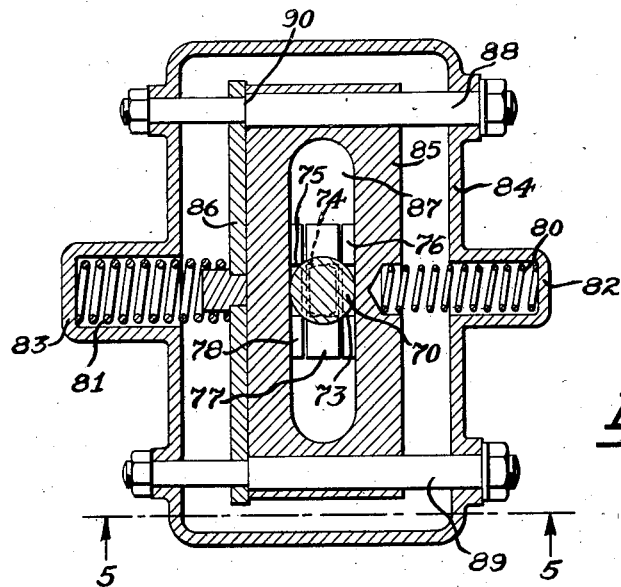
*Fig-6-*
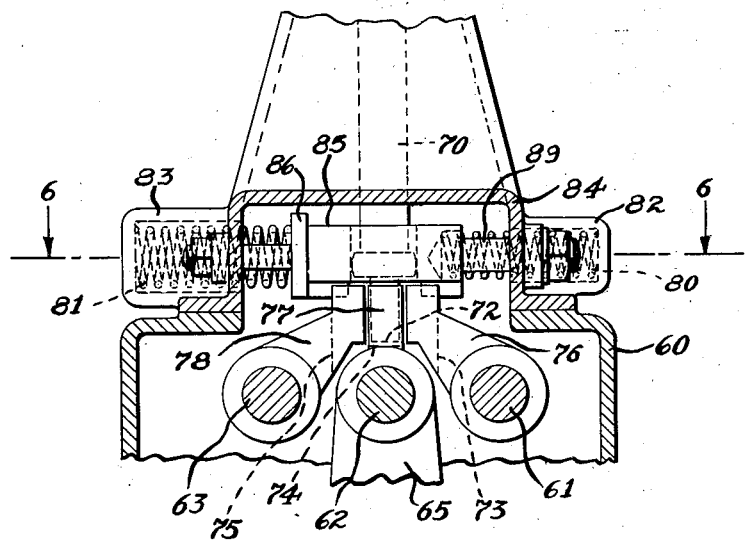
*Fig-5-*
INVENTOR
Earl R. Fish
BY
Bodell + Thompson
ATTORNEYS.

Patented Nov. 13, 1934

1,980,262

UNITED STATES PATENT OFFICE 1,980,262

TRANSMISSION GEARING

Earl R. Fish, Syracuse, N. Y., assignor to W. C. Lipe Inc., Syracuse, N. Y., a corporation of New York Application July 18, 1931, Serial No. 551,649

1 Claim. (Cl. 74—333)

This invention relates to change speed transmission gearing, such as are used in motor vehicles, and has for its object (1) a particularly simple and efficient mounting for the countershaft, whereby its bearings are located at the extreme ends thereof, and the countershaft with the gears thereon can be assembled as a unit in the gear box, and the gears at the ends of the shaft run close to the front and rear walls of the gear box with the bearings of the countershaft within the gears, or within the plane of the gears; (2) a particularly simple and efficient gear arrangement whereby the end thrust on the shaft during the different speed changes is practically neutralized; (3) an arrangement of the reverse gear including a shiftable idler located near the gears which are located adjacent the rear wall of the gear box; (4) spring means for centralizing the gear shifting lever when it is in neutral and central position, which spring means acts in transverse alinement with the lever of the notches of the shift rods when they are in alinement in neutral position, one of the springs being stronger than the other in order that the driver must make a deliberate effort to shift from neutral into either of two speed changes, as overdrive and reverse.

The invention consists in the novel features and in the combinations and constructions hereinafter set forth and claimed.

In describing this invention, reference is had to the accompanying drawings, in which like characters designate corresponding parts in all the views.

Figure 1 is a vertical, sectional view of a gearing embodying this invention.

Figure 2 is a fragmentary, sectional view through the countershaft and contiguous parts.

Figure 3 is an enlarged, sectional view on line 3—3, Figure 2.

Figure 4 is a fragmentary end view, partly broken away, looking to the left in Figure 2.

Figure 5 is a fragmentary, transverse, sectional view through the cap, taken on line 5—5, Figure 6, of the gear housing showing the gear shifting mechanism.

Figure 6 is a sectional view on line 6—6, Figure 5.

I have here illustrated this invention as embodied in a conventional type of transmission gearing comprising a gear box 1 a drive shaft 2, a transmission shaft 3, and a countershaft 4, with the gears between the same. The drive shaft and the transmission shaft are mounted in axial alinement in the front and rear walls 5, 6, of the gear box, the transmission shaft having the usual pilot bearing, not shown, in the rear end of the driveshaft. The countershaft is mounted, as will be presently described.

10 and 11 designate respectively a pair of gears mounted on the drive shaft and the countershaft, these being preferably helical gears.

12 and 13 designate the gears of a pair mounted respectively on the transmission shaft 3 and the countershaft 4, these being also helical gears.

14 and 15 designate a third pair of helical gears, these being mounted respectively on the transmission shaft 3 and the countershaft 4 adjacent the rear wall 6 of the housing. The ratios between the gears 12 and 13, and between the gears 14 and 15, are different from each other and also from the ratio between the driving gears 10 and 11.

16 and 17 designate respectively a double spur gear mounted on the transmission shaft 3 and shiftable axially thereof, these being shiftable forwardly in one direction from neutral to engage the gear 16 with the spur gear 18 on the countershaft 4, and rearwardly from neutral to engage the gear 17 with the spur gear 19 on the countershaft 4.

20 and 21 is a double gear constituting a reverse idler, this being mounted on a shaft at one side of the countershaft and shiftable forwardly to carry the gear 20 into mesh with the gear 17, and the gear 21 into mesh with the gear 19 on the countershaft to produce reverse speed. The pairs of helical gears are constantly in mesh, and the gears 10 and 12 mounted respectively on the driving shaft 2 and transmission shaft 3 are connected to said shafts respectively by a sliding clutch element 25 having internal teeth and slidable on an external clutch element 9 on the front end of the transmission shaft 3 in mesh, either with a clutch element 26 rotatable with the drive shaft, or with a clutch element 27 rotatable with the gear 12. The shiftable gears 16 and 17 are slidable on the transmission shaft 3 in opposite directions from neutral. The gear 14 of the overdrive is connected to the transmission shaft by means of a shiftable collar 28 having an internal toothed clutch element 29 which coacts with an external toothed clutch element 30 rotatable with the gear 14. The clutches per se, form no part of this invention.

The gear 11 of the driving pair of gears, and the gear 15, are mounted on the countershaft 4 adjacent the front and rear walls 5, 6 of the gear box, and the countershaft, instead of being mounted in bearings in the front and rear walls, or in the plane of the front and rear walls, is mounted in bearings in the planes of the toothed faces of the end gears. The countershaft has a power take off gear 31. This forms no part of this invention.

As seen in Figure 2, the countershaft is mounted on bearings 35 and 36 interposed between studs 37 and 38 projecting from the bearing caps 39 and 40 detachably mounted in openings 41 and 42 in the front and rear walls 5, 6. The bearings are preferably of anti-friction type, and each includes inner and outer raceways 43 and 44 with anti-friction members as rollers or balls between them. The outer raceway is located in a recess 45 coaxial with the shaft 4 and formed in the gear 11 or 15, and the inner raceway is also located in this recess, but mounted on the stud 37 or 38. The anti-friction bearings here shown are Timken bearings, and are combined journal and thrust bearings. The bearing caps 39 and 40 are provided with hubs or plug portions which fit the openings 41 and 42 and are secured in position by screws 46 extending through annular flanges 47 on the cap and lapping the outer faces of the front and rear walls.

By this construction, the countershaft with the gears thereon can be assembled as a unit and placed into the gear box and then, the bearing caps inserted in position and the end gears 11 and 15 can be located as close as possible to the front and rear walls. By this construction of the countershaft and the bearing arrangement, the countershaft is more firmly supported against vibration. Suitable shims or washers are inserted between the flanges 47 and the outer faces of the front and rear wall, which shims or washers are removable for the purpose of adjusting the bearings.

In order to further stiffen the support of the countershaft and to reduce noise vibration, the bottom 50 of the gear box is formed with wells 51 and 52 at the ends thereof, into which wells the gears 11 and 15 extend and with a lengthwise hollow rib 53 forming a trough 54 below the intermediate part of the countershaft, the outer face of the bottom wall following the contour of the rib or trough. The trough is of different heights as at 55 and 56 to conform to the sizes of the gears 13, 18 and 19 on the intermediate part of the countershaft.

It will be understood that the gear box is filled, or partly filled with lubricant, and that the trough provides a lubricant passage between the wells at the end of the gear box.

In order to neutralize the thrust on the countershaft, the incline of the teeth of the gears 12 and 13 is such as to neutralize the end thrust on the countershaft 4 that would occur because of the helical gears 10 and 11 and likewise, the angle of the teeth of the gears 14 and 15 is such as to neutralize the end thrust of the gears 10 and 11.

In Figure 1, A indicates the angle of the helical gears 10 and 11, and B the angle of the gears 12 and 13, and C the angle of the gears 14 and 15, the angle B being such, for the particular ratio between the gears 12 and 13 as to neutralize the end thrust of the gear 11 when the gear 12 is connected to the transmission shaft 3. Likewise, the angle C of the teeth of the gears 14 and 15 is of such inclination, for the particular gear ratio, as to neutralize the thrust of the gear 11 on the shaft 4 when the gear 14 is clutched to the transmission shaft 3.

The shifting mechanism includes shifting rods, and a selecting and gear shifting lever. These rods are slidably mounted in the usual manner in the cap 60 of the gear box.

61, 62 and 63 designate respectively shift rods, the rod 61 operating a fork 64 which shifts the double gears 16 and 17 to effect first and second speeds. The rod 62 operates a fork 65 coacting with the clutch element 25 for effecting third and fourth speeds by connecting the gear 12 to the transmission shaft 3, or directly coupling the drive shafts 2 and 3 together. The rod 63 is provided with a fork 66 coacting with the collar 28 and shifting of the rod 63 in one direction causes the collar 28 to clutch the gear 14 to the transmission shaft 3, and in the other direction shifts the double idler 20 and 21 through a fork 67 to mesh the gear 21 with the gear 19 on the countershaft, and the gear 20 with the gear 17 on the transmission shaft and produce reverse speed.

70 designates the gear shifting lever mounted in the usual manner to have a selecting movement laterally into engagement with any one of the rods 61, 62, 63 and forwardly and rearwardly to shift the selected rod. The shifting lever 70 has the usual finger 72 at its lower end for entering any one of a plurality of notches 73, 74, 75, in arms 76, 77 and 78 on the hubs of the forks or blocks mounted respectively on the rods 61, 62 and 63, these notches being arranged in transverse alinement when all the shiftable elements or gears of the gearing are in neutral position.

The finger 72 is normally arranged in the notch 74 of the central shift rod 62. In order to center the lever, when in central position, springs are provided which act in opposite directions on the lower end of the gear shifting lever 70 and when all the notches are in alinement move it into central position in engagement with the central shift rod 62, and in order that the operator may be required to make a deliberate effort to engage the lever 70 with the rod 63 to select it, one spring is stronger than the other, and in order that this spring may not act on the lever after it is in central position, means is provided for limiting the movement of the stronger spring.

80 and 81 designate respectively the springs acting in opposite directions on the lever 70, each spring being arranged in line with the neutral position of the lever 70, or in line with the notches 73, 74 and 75 when they are in neutral position, the springs thrusting at their outer ends against the bottoms of suitable sockets 82 and 83 formed in a housing 84 in which the lever 70 is mounted, and the lighter spring 82 thrusting at its inner end directly against the guide block 85, the stronger spring 83 thrusting inwardly against a spring abutment 86 which is limited in its movement. The guide block 85 is formed with a lengthwise slot 87 which permits the forward and rearward shifting movement of the lever 70, and the block is mounted to slide laterally during the selecting movement of the lever 70, it being here shown as mounted on front and rear guide rods 88 and 89 mounted in the housing 84, these guide rods having shoulders 90. The abutment 86 is slidably mounted on the rods and thrusts against one side of the block 85 and is limited in its movement by the heavier spring 81 by the shoulders 90.

In operation, when the shifting lever is moved to the left Figure 6, the block 85 is moved to the left against the action of the spring 81 thus thrusting the abutment 86 away from the shoulders 90 permitting the finger 72 of the shifting lever 70 to engage the notch 75 in the arm 78 on the shift rod 63. This shift rod when shifted in one direction produces reverse speed, and when shifted in the other direction, the over-drive through the gears 14 and 15. When the lever is shifted back to neutral, the spring 81 reacts, but its movement is limited by the fact that the movement of the abutment is stopped by the shoulders 90 when the block 85 reaches central position, and the shifting lever 70 reaches central position. When the shifting lever is shifted to the right, it is shifted against the action of the lighter spring 80 which is normally strong enough to return the lever 30 to central position when it has been shifted to neutral. It does not act as a barrier as does the spring 81. Owing to the central arrangement of the springs, binding of the block 85 on the guide rods, is avoided. Heretofore, four springs have been used acting on the ends of the block. The four springs have a tendency to bind the block in its sliding movement as it is impossible to get all four springs, or any two of them, exactly alike.

What I claim is:

In a gearing, a gear box, a shaft with gears thereon mounted in the box near the bottom thereof, two of said gears being located at the extreme ends of the shaft, and having hubs mounted on the ends of the shaft and extending beyond the ends of the shaft forming bearing recesses, demountable bearing supports in the walls of the gear box and removable and replaceable from the outer sides of said walls by an axial movement and having studs extending into the recesses, all whereby the shaft assembly including the gears thereon can be placed in the gear box, as a unit, and the bearing supports therefor afterwards placed in position, and also, whereby the gears run close to the supporting walls of the gear box.

EARL R. FISH.